United States Patent [19]

Ahlen

[11] 3,964,347
[45] June 22, 1976

[54] TORQUE CONVERTER TRANSMISSION HAVING ROTATING CASING, AND RELEASABLE PUMP

[75] Inventor: Karl Gustav Ahlen, Stockholm, Sweden

[73] Assignee: S.R.M. Hydromekanik Aktiebolag, Stockholm-Vallingby, Sweden

[22] Filed: Feb. 14, 1975

[21] Appl. No.: 550,144

Related U.S. Application Data

[62] Division of Ser. No. 262,514, June 14, 1972, Pat. No. 3,893,551.

[30] Foreign Application Priority Data

June 25, 1971 United Kingdom............... 29886/71
Sept. 9, 1971 United Kingdom............... 42130/71

[52] U.S. Cl..................................... 74/733; 60/341; 60/349
[51] Int. Cl.² ..................... F16H 57/10; F16D 33/02
[58] Field of Search ............ 74/730, 731, 732, 733; 60/349, 364, 341, 343

[56] References Cited
UNITED STATES PATENTS

| | | |
|---|---|---|
| 2,607,456 | 8/1952 | Jandasek............................ 192/3.26 |
| 3,180,094 | 4/1965 | Ahlen............................ 74/730 UX |
| 3,693,478 | 9/1972 | Malloy................................. 74/731 |
| 3,839,864 | 10/1974 | Ahlen .................................. 60/349 |
| 3,886,740 | 6/1975 | Krok .................................... 60/341 |

*Primary Examiner*—Samuel Scott
*Assistant Examiner*—Lance W. Chandler
*Attorney, Agent, or Firm*—Larson, Taylor and Hinds

[57] ABSTRACT

A torque converter of the type having a rotating casing connectable to a driving source and forming a working chamber. In the casing is a pump part comprising a ring of pump blades, a reaction part comprising a ring of guide blades and a turbine part including at least one ring of turbine blades. The pump part is mounted to be selectively connected to the casing for rotation therewith or released from the casing to rotate freely relative thereto. The selectable connection between the pump part and the casing may be a friction coupling such as engaging conical friction surfaces or a friction disc coupling. The pump part itself may serve as a piston for engaging or disengaging the pump part with the casing. Movement of this pump part may also control a direct drive connection between the casing and the turbine shaft. A forward reverse gear and/or a synchromesh gear may be connected to the turbine shaft.

26 Claims, 12 Drawing Figures

TORQUE CONVERTER TRANSMISSION HAVING ROTATING CASING, AND RELEASABLE PUMP

This is a division of application Ser. No. 262,514 filed June 14, 1972. Now U.S. Pat. No. 3,893,551.

BACKGROUND OF THE INVENTION

The present invention refers to a torque converter transmission having a rotating casing, which is connected to a driving source, and in which the pump part, the turbine part, and the reactor part of the torque converter are mounted.

Torque converters of this kind are previously known, in which the pump part is constantly connected to the rotating casing and the turbine is connected to the output shaft. The said prior art converters are under certain conditions subject to some disadvantages, and in most applications the torque converters are necessarily combined with additional structures, which however do not solve all of the serious disadvantages. The Jandesek U.S. Pat. No. 2,607,456 shows an arrangement in which the pump part is releaseable from the rotating casing. This invention therefore has an object to propose a new and improved torque converter transmission of the type in which the pump part is releaseable from the casing.

A torque converter of the present type may be combined with step gears of power shift types or synchromesh types or it might be connected directly to the driving wheels by gears and shafts.

Such a torque converter transmission may also have a lock-up clutch, but in all applications there must be the possibility to release the torque transmission through the torque converter and/or torque absorption by the torque converter in one way or another. This may be done in the power shift gear by releasing the clutches or brakes, or a release clutch for braking the drive line may be provided in front of or at the rear of the torque converter, or a dog clutch having means for connection may be provided. In the case where the release clutch is provided on the primary side, i.e. in front of the torque converter, certain difficulties will arise, in particular in a torque converter of the rotating casing type, since a relatively large mass is connected directly or indirectly to the primary side of the gear train following the torque converter, and since the speed of the main part of said large mass changes for each connection to drive or for each change of the drive connection, but also because there are difficulties in providing power take offs, and further because the indirectly connected mass, at the change of connection, will synchronize slowly and during the synchronizing generate torque, which will prevent the change of drive before the torque disappears.

If on the other hand the release clutch is provided on the secondary side of the torque converter the clutch must connect under a torque, which may be three to ten times stronger than the engine torque, which requires a strong force to close the clutch or even a large size friction clutch. Further, when closing said clutch the torque limit for the coupling will also generate corresponding stresses to the connected drive line. At each connection a large torque wave will also be transmitted to the vehicle. Frequent connections also require either large friction surfaces or special arrangements for cooling the friction surfaces of the torque converter.

Irrespective of whether the coupling is mounted in front of or at the rear end of the torque converter it is impossible to obtain soft connections or soft shifts of the connected gears. Further, if the coupling is provided in front of the transmission there will be difficulties in providing for power take offs, and this arrangement will also extend the period between connection and drive and will form an inconvenient effect on the engine by reducing its speed to synchronize the mass of the engine and the mass of the torque converter primary part, and it will also eliminate the advantage of a rotating casing torque converter as a dampening means and a part of the engine fly-wheel mass.

It is therefore clear from the above that is is impossible to obtain ideal connections or disconnections of the torque converter irrespective of whether the release clutch is provided in front of the torque converter or at the rear end thereof.

SUMMARY OF THE INVENTION

It is a purpose of the present invention to avoid the disadvantages in prior torque converter transmissions and provide a torque converter transmission which may be manufactured at a lower cost than was possible heretofore.

In the torque converter according to the present invention the rotating casing of the torque converter is constantly rotationally connected to the engine and in most cases the rotating casing may be used as a part of the fly-wheel mass of the engine. Since the casing is rotationally fixed to the engine, any part of the casing can always be used for providing a power take off. At the same time the secondary side of the torque converter is always connected to the primary part of any following drive line member and rotates together therewith.

The release means of the torque converter according to the invention is a friction coupling, which is provided between the pump part and the rotating casing, and said friction coupling being adapted to work entirely in fluid, so that it will be constantly cooled thereby allowing a high frequency of connection and disconnections at extremely high speed and power conditions. Further, the mass to be connected, i.e. the pump part, is very small assuring minimum wear of the coupling, and depending on the type of torque converter, 1 ½-stage, 2-½-stage, 2-stage or 3-stage, there is for the 1-½-stage and the 2-½-stage type converters practically no increase of the torque over the normal torque for the speed, and for the 2- or 3-stage type converters there will be a torque increase depending on the input torque ratio due to the difference between the maximum engine speed and normal stall speed when connected.

As the connection occurs, the fluid in the torque converter serves as a cushion and as a torque limiting device between the engine and the secondary shaft at the same time as a limited torque increase at stalling and low speed ratios can be obtained depending on the particular torque converter for such applications where this is desired.

The releasable pump allows a torque converter to have a fixed guide practically without any substantial torque absorption from the engine when the pump is released independently of the speed at which the turbine is driven or of whether it is released or kept stalled.

In the event that the torque converter has a lock-up clutch, i.e. a means for directly connecting the engine with the output shaft, the releasable pump part can also be used as a servo motor piston for providing this direct drive from the casing through the pump part to the output shaft, and such direct drive may also be softly connected because of the application of fluid pressure according to the invention without any fluid flow being stopped, and since the complete casing in this device is used as a damping cylinder during connection.

In accordance with a preferred embodiment of the invention the release means can be used as a free-wheel due to the fact that the release means can be connected under all driving conditions without the risk of any torque shocks. It will just give a soft synchronizing of the primary and secondary sides of the torque converter.

A further advantage of the invention is that when the pump is released the torque converter will allow the engine to accelerate to maximum speed without load, which gives the shortest possible acceleration of a turbo charged engine, and the torque converter may thereupon be connected without any substantial torque shock, since the fluid in the torque converter acts as a damper, but depending on the selected torque converter an increased secondary torque having at least a 50% higher stall torque ratio may be obtained.

BRIEF DESCRIPTION OF THE DRAWINGS

The invention will now be further described by way of example with reference to the accompanying drawings.

DETAILED DESCRIPTION OF THE PREFERRED EMBODIMENTS

In FIGS. 1 through 7, like parts have the same reference numbers, and special parts for each figure have reference numbers in 100-series with the number of the figure as the first digit of the reference number.

In FIGS. 1 through 7 the following reference numbers indicate like parts: 2 is a rotating casing in which a pump part 4, a turbine 6 having a first turbine row 8 and a second turbine row 10 and guide vanes 12 are mounted. The guide vanes are carried by a disc 14, and the pump 4 has a side ring 16, and the turbine is carried by a hub 18. The two turbine rows 8 and 10 are connected by a part of the inner core 20, and the first turbine row 8 has a side ring 22. The turbine 6 is mounted on a shaft 24 journalled in the rear end by means of a bearing 26 and in the front end by a bearing 28 in the rotating casing 2, which is in turn mounted at its front end in the driving source by means of a guiding surface 30, and at its rear end by means of the bearing 32. The rotating casing 2 has an abutment 34 formed with a sealing surface 36 and a gear 38. The rotating casing bearing 32 and the guide vane disc 14 are mounted on a stationary abutment 40, and said stationary abutment 40 is sealed by O-ring seals 42 against the rotat casing 2 and by means O-ring seals 44 against the turbine shaft 24, and the stationary abutment 40 and the turbine 6 are provided with channels 46 and 48 alternately forming an inlet passage or an outlet passage for the working chamber 49, and channels 50, 52, 54, 56 alternately forming an outlet passage or an inlet passage for the working chamber 49. The rotating casing 2 is driven by a spline connection 60 in the flywheel of the driving source.

In the description of the preferred embodiments, terms of direction such as "up", "down", "right", "left", etc. will be used only for convenience with respect to the drawings, and it is to be understood that these terms in no way limit the invention in practice.

Figure 1:
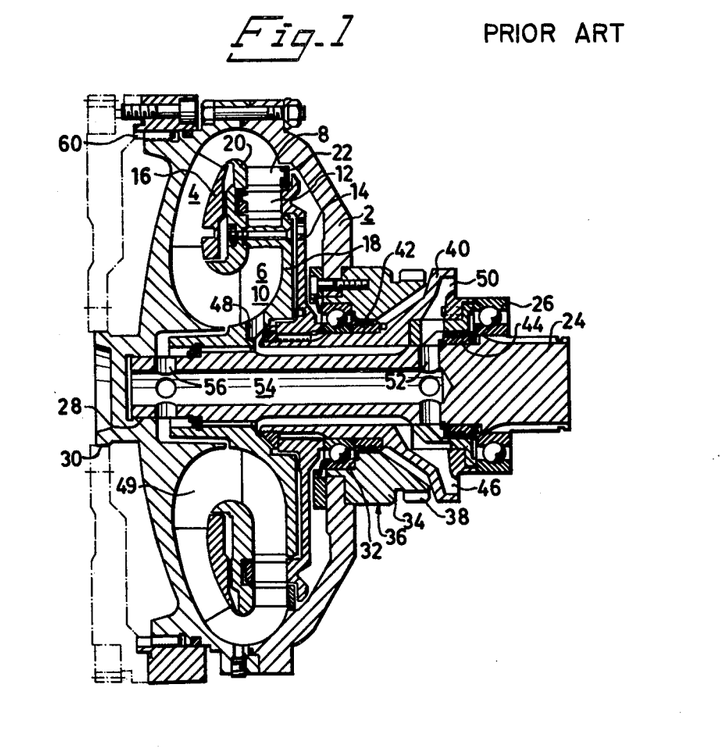
FIG. 1 is a longitudinal section through a prior art simple type of torque converter.
Figure 2:
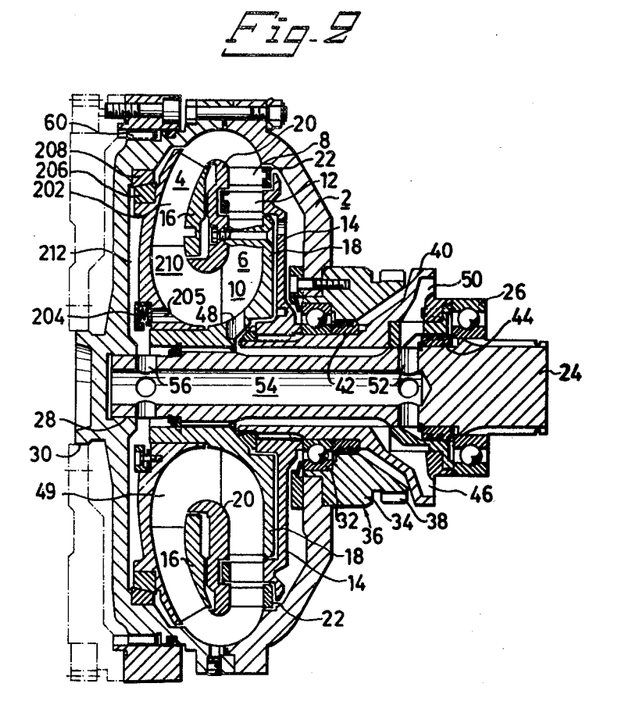
FIG. 2 shows a torque converter similar to that illustrated in FIG. 1 in that it has stationary guides vanes, but constructed in accordance with the present invention to include with means for for controlling the engagement and disengagement of the pump to the rotating casing.

In FIG. 2 the pump is made a separate part 202 having a one-way maximum pressure valve 204 acting as a minimum pressure difference means and provided with a channel 205, and a cone clutch ring 206; and the rotating casing is provided with a cone clutch ring 208. When the fluid enters through the channels 50, 52, 54, 56 in FIG. 2 the pump part 202 is forced towards the turbine, whereby a space is formed between the cone clutch rings 206 and 208, and the fluid may pass through the working chamber 210 and vent through the channels 48 and 46 without passing through the maximum pressure valve 204. When on the one hand the fluid enters the channels 46 and 48 it will force the pump part 202 to the left, so that the cone clutch rings 206 and 208 come into sealing engagement, and the fluid has to open the maximum pressure valve 204 for the evacuation therethrough thereby assuring that the basic pressure in the blade system working chamber 210 is higher than in the space 212 between the pump part 202 and the rotating casing 2. When the pressure difference between chamber 210 and space 212 exceeds that for which valve 204 is set, the fluid passes through valve 204 and is then vented through the channels 56, 54, 52 and 50. In a sense, therefore, the entire area within the casing forms a servo-motor for engaging and disengaging the pump part and the casing, and the pump part itself forms the piston portion of this servo-motor. It is an important advantage that these conical clutch surfaces serve as a fluid seal between chamber 210 and space 212 when engaged. As a result thereof it is unnecessary to provide in addition to the clutch surfaces a large diameter rotating seal. Moreover, the sealing surfaces to not change, even when overheated.

As described above, the pump part 202 can be released from the driving source and merely engaged to the turbine part.

Figure 3:
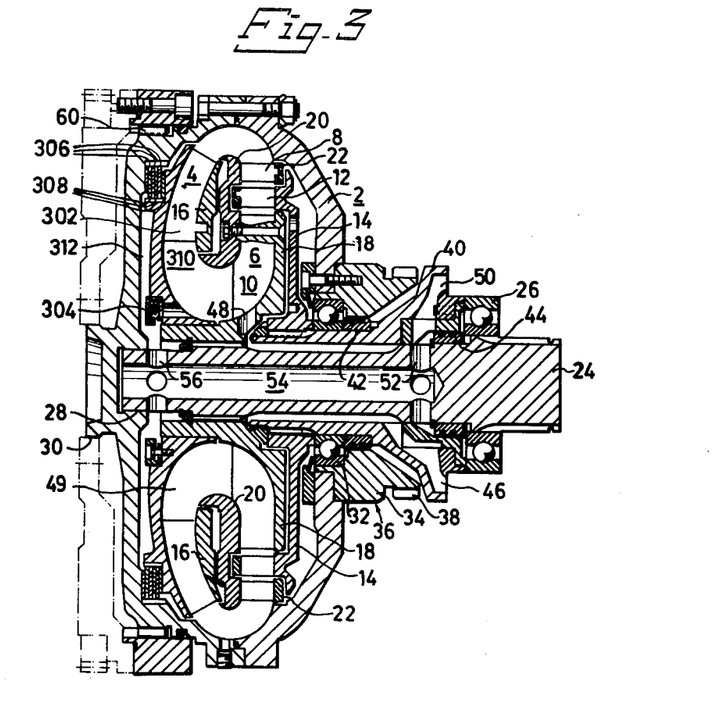
FIG. 3 shows a modified embodiment of the torque converter according to FIG. 2, arranged to allow a modulated connection of the pump to the rotating casing.

FIG. 3 shows an embodiment which differs from that according to FIG. 2 in that the cone clutch parts 206 and 208 are replaced by interleaved frictions discs 306 and 308, which are connected by spline connections to the casing 2 and the pump part 302 respectively. The friction discs are formed with grooves permitting an amount of cooling fluid to pass from the working chamber 310 to the space 312 between the pump 302 and the rotating casing 2, even when the discs are engaged, without passing the maximum pressure valve 304. The reason for this is that the device is meant to be used for modulating connection of the pump part 302 to the casing 2, which may be accomplished for instance by varying the fluid circulation quantity in relation to the stiffness of the springs in the maximum pressure valve 304.

Whichever type of clutch is used between the pump part and the casing, it has proved to be most advantageous that the hydraulic fluid which generally fills the interior of the torque converter on both sides of the pump part, flows through the space between the clutch parts when the pump is released from the casing (and in the FIG. 3 embodiment, also when the clutch is engaged). This flow provides a rapid, efficient cooling of the clutch surfaces. As a result of this cooling effect, it is possible to connect the pump to the rotating casing (a) for short intervals, e.g. 30 seconds, and/or (b) while the casing is rotating at maximum speeds. This is due at least in part to the fact that with this cooling effect it takes only 0.1 seconds to make the connection only after a further 0.1 second interval the flow circulation in the torroidal chamber has reached its maximum. During this latter 0.1 second interval, the torque rises to normal for the speed ratio, but not higher.

Figure 4:
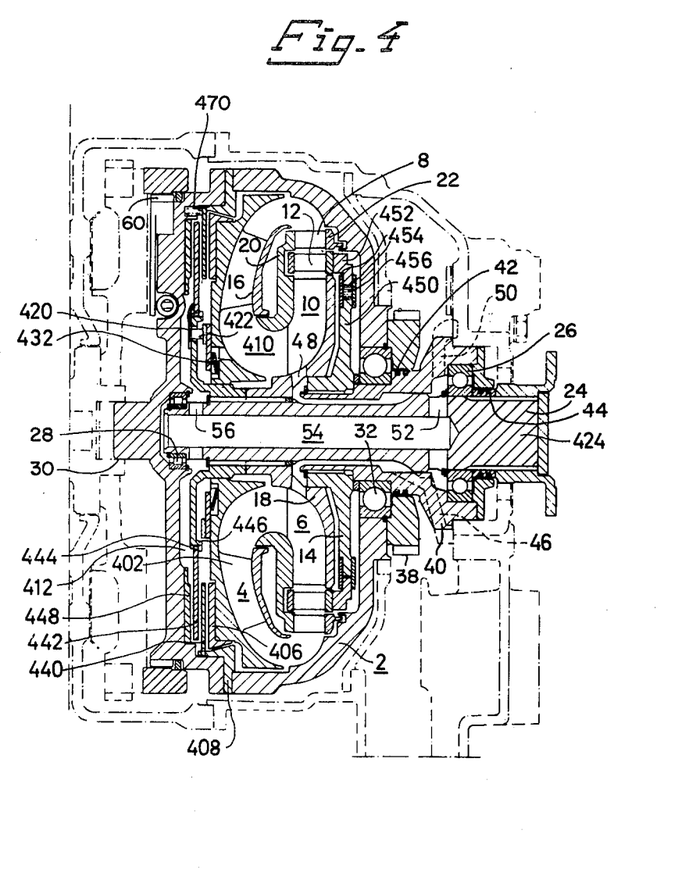
FIG. 4 shows a further embodiment of a torque converter according to the invention having means of controlling the connection and disconnection of the pump to the rotating casing combined with means for controlling the connection of the direct drive and means for free-wheeling the guide vanes.

In FIG. 4 the pump part 402 is formed as a servo-motor piston with three positions. In one position, the neutral position, the piston has the same oil pressure on both sides or a slightly higher pressure in the working chamber 410 than in the chamber 412 between the pump 402 and the rotating casing 2. In this position the same fluid pressure is generally present in the channels 46, 48 as in the channels 50, 52, 54, 56. In a second position of the servo-motor piston fluid enters space 412 through the channels 50, 52, 54, 56 thereby providing a pressure difference between the chamber 412 and the working chamber 410, due to which the pump element 402 will force the cone clutch element 406 to the right into engagement with the cone clutch element 408 of the rotating casing, thereby bringing the pump element 402 into engagement with the rotating casing 2 so as to establish a hydraulic drive. Any additional fluid into space 412 will pass through the two-way maximum pressure valve 432 into chamber 410. The cone clutch may be connected and disconnected for slight movements even when the rotating casing 2 is rotating at full speed, whereby torque may be obtained from the turbine shaft, but the connection cannot be modulated unless the cone clutch is replaced by a multiple disc clutch device like 306 and 308 of FIG. 3 which may easily be done. In a third position of the servo-motor piston fluid enters through the channels 46 and 48, and the fluid has to pass the two-way maximum pressure valve 432 before it vents through the channels 56, 54, 52, 50 thereby establishing a pressure difference between the working chamber 410 and the space 412 whereby the pump part 402 moves to the left, forcing a disc 440, which is rotationally fixedly mounted in the rotating casing 2, in opposition to spring 470, against the friction plate 442. As shown in cross-section in the drawings, this two-way maximum-pressure valve may take the form of a bellville spring. Plate 442, which is mounted on the turbine shaft 424 by means of a spline connection 444 with the hub 446, is in turn forced against a friction plate 448 which is connected to the rotating casing 2, whereby a fixed connection is obtained between the rotating casing 2 and the turbine shaft 424, which means that the torque converter is locked up for direct drive. While the parts are in the said first position, i.e. the neutral position, there could be a tendency for the pump part 402 to move towards and possibly against the disc 440 as a result of a phenomenon known as "rotation paraboloids" which occurs when fluid between these two parts rotates about the main axis. To prevent this from happening, a spring means is provided for maintaining the required spacing between 402 and 442 in this neutral position. This comprises a stiff spacer element 422 which abuts 402 and extends therefrom to the left through an opening in hub 446 against a spring 420 which is attached to 440 and at its upper end is raised towards 442 and the lower end thereof is biassed towards the right against the left end of spacer 422.

To allow this locking up of the torque converter, the disc of the reaction member is formed with a free-wheel connection allowing the guide vanes 12 to rotate freely in the same direction as the rotating casing 2 but not in the opposite direction. This free-wheel connection comprises a disc part 450 which is connected to the stationary abutment 40, a free-wheel 452, axial guide rings 454 and rollers 456, whereby the rollers, in a way known per se for a free-wheel connection, take hold between surfaces with narrowing distance in the direction in which the ring is to be prevented from rotating. It will be noted that the free-wheel is positioned on the disc, which differs from some prior art arrangements which, like the clutch in the said Jandasek U.S. Pat. No. 2,607,456, are located on the hub of the disc. As a result of this improved positioning of the free-wheel on the disc the free wheel can be shorter in the axial direction, thereby permitting a shortening of the axial length of the torque converter. Also, this arrangement is more economical.

Figure 5:
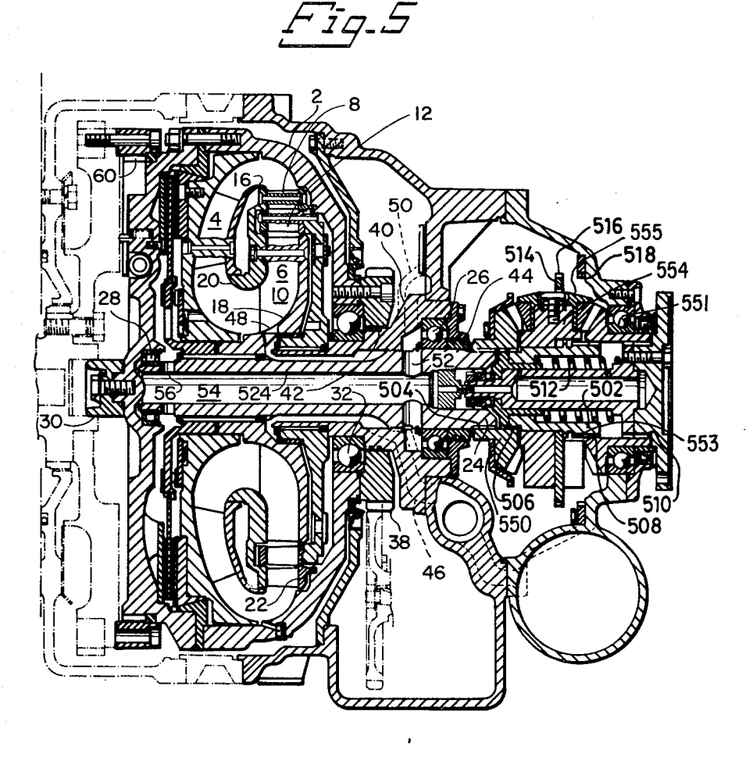
FIG. 5 shows a torque converter of the type illustrated in FIG. 4 provided with a reverse gear to demonstrate the utility of the invention to obtain simple shifts between forward and reverse connection of a reverse gear connected to the torque converter according to the invention.

FIG. 5 shows the same structure as in FIG. 4 additionally provided with a forward/reverse gear of a type having only two connection positions, one for forward and the other for reverse. This gear is described in greater detail in my U.S. Pat. No. 3,734,252, issued on May 22, 1973. The reverse gear comprises a sleeve 502, which connects input bevel gear 550 to output bevel gear 551 for forward drive by spline connections 504, 506, 509 and 510. A spring 512 keeps the forward gear engaged. One of the features of the invention is most easily explained in connection to this combination, namely the possibility of using a reverse gear with only two engagement positions and no neutral position combined with a torque converter of the rotating casing type.

Figure 10:
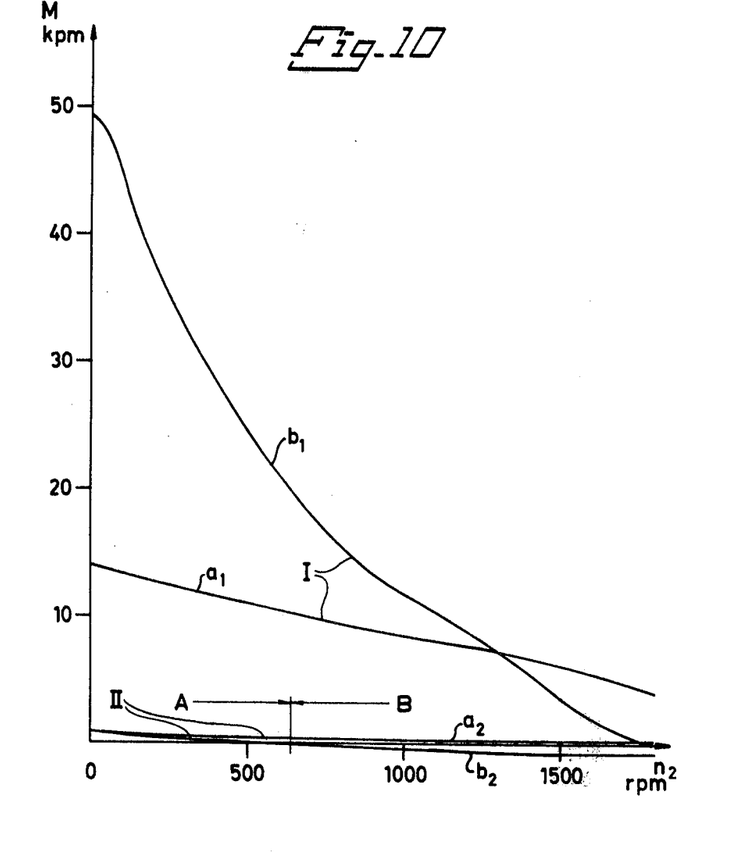
FIG. 10 is a diagram illustrating the input and output torque with the pump connected and disconnected at different speeds of the turbine.

With reference to FIG. 10 (curve lines a and b), it is evident that a very low torque is applied to the turbine when the pump part is connected to the turbine. Sufficient torque to allow the turbine to be stalled can be obtained by a friction plate in the reverse gear. However, this is not necessary. The reverse connection is obtained by a servo-motor acting against a shift fork, which in turn is biased against the member 514 move it to the right. This does two things. First, it engages ridge 553 on sleeve 502 to move sleeve 502 to the right, thus breaking the spline connection between 550 and 553. Secondly, it connects the spline 516 with a spline 518 to prevent planetary gear carrier 554 from rotating so that 550 drives 551 in reverse via planetary gears 555.

A normal problem with torque converters of the type in question is that it must be possible to tow a bus or a truck. This normally necessitates a complete disconnection between the engine and the wheels. This involves difficulty in all torque converter transmissions having rotating casings and dog clutch shift reverse. Due to the fact that the complete torque converter blade system in the present case is connected to the secondary shaft when the pump is disconnected, and due to the fact that the torque necessary to drive all turbines in a stationary casing is so small, it is quite satisfactory to simply utilize the disconnection of the pump from the rotating casing. Even if the bus or truck is driven with high speed for a long time the cooling of the casing by the fluid will be sufficient. Another feature of the invention related to the above mentioned problem is that with the present invention it is possible to run the engine at top speed thereby driving the accessories from the gear wheel on the secondary side of the rotating casing as it may be required for instance on a fire engine, while the turbine is still connected to the wheels. Then if a slight movement of the vehicle is required, this can be obtained by intermittent connections of the pump to the rotating casing in a converter having a cone clutch, or by modulated connection in case of a converter having a multiple disc clutch. The above mentioned features are new for existing torque converter transmission systems. It is to be noted that these features are obtained practically without any complications. Another advantage of the invention is that when the present invention is ilized on a DS transmission on a bus, then at each bus stop the pump is released instead of the guide vane as on the DS transmission which does not include the present invention. This results in fast and shockless connections as well as low full consumption at the bus stop and less exhaust gases.

Figure 6:
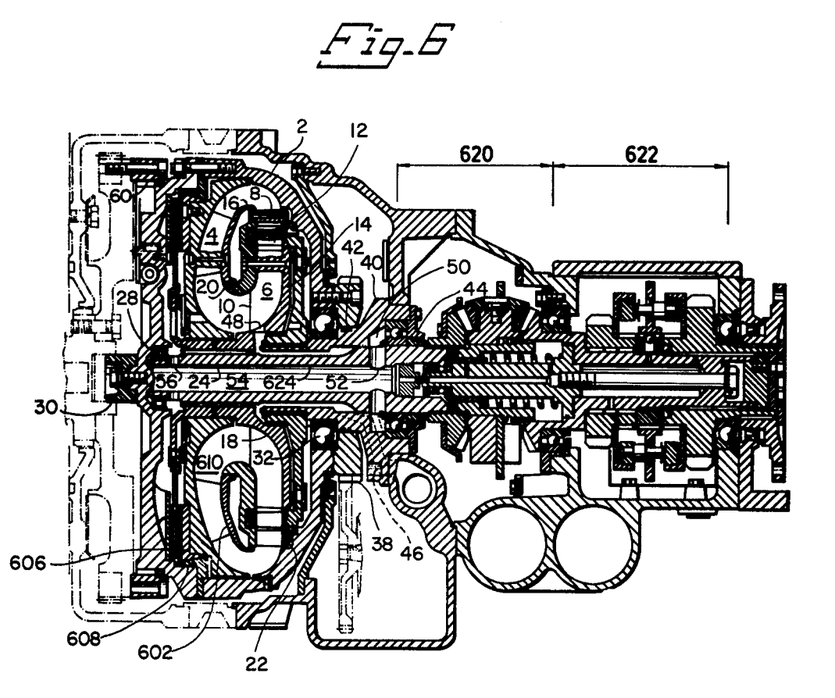
FIG. 6 shows a torque converter according to FIG. 5 additionally provided with a two-step mechanical gear of the synchromesh type demonstrating the utilization of the structure according to the invention to simplify the arrangement of a hydromechanical transmission including a gear of the synchromesh type.

FIG. 6 shows a structure of the same type as in FIG. 5, the forward-reverse gear being designated 620, and a two-speed gear box 622 having synchromesh couplings. The same structure which was used for the arrangement according to FIG. 5 is also used in the multiple speed gear arrangement according to FIG. 6. This is possible since the torque for reducing or accelerating the turbine including the reverse gear, which rotates as a unit, is not much greater than the normal amount for a friction clutch disc, because the normal manually disconnected friction disc is often not completely disconnected when the driver tries to change gears. It is however foreseen that the synchronizers are over-sized and are provided with surfaces in proportion to the mass and drag to be overcome in the two different devices. With this arrangement a very simple torque converter transmission with rather high performance has been obtained.

Figure 7:
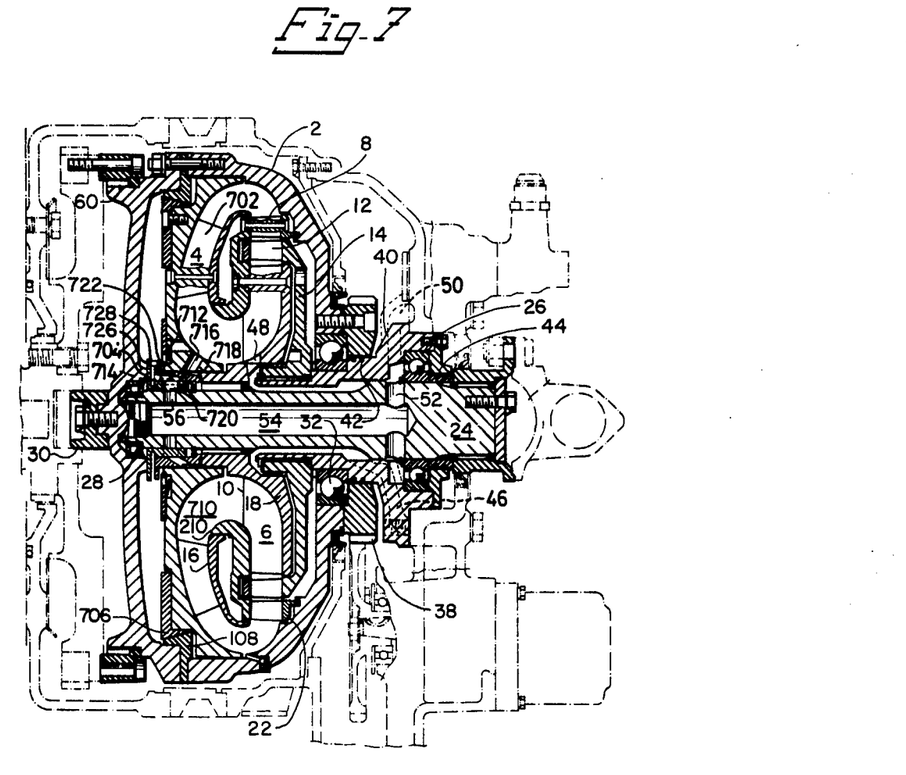
FIG. 7 shows a torque converter of the kind illustrated in FIGS. 2 and 3 but having a different arrangement of the friction elements, including a valve arranged as a quotient regulator automatically acting to release a torque absorption and torque transmission above a speed ratio of 1:1.
Figure 7A:
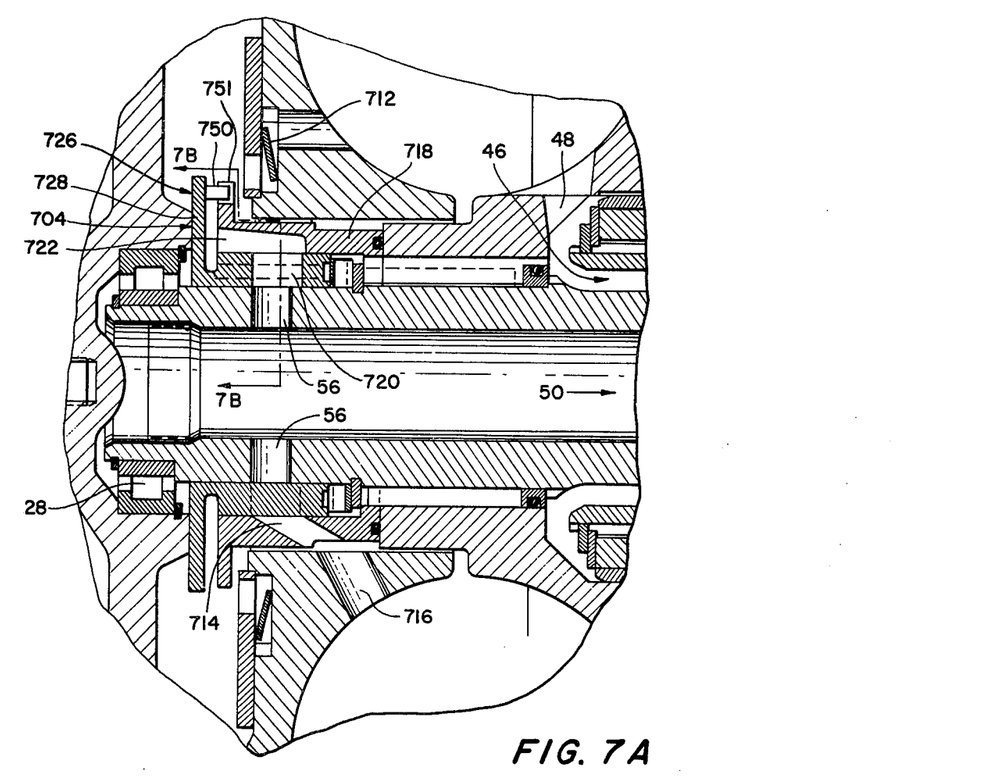
FIG. 7A is an enlarged view of a portion of FIG. 7.
Figure 7B:
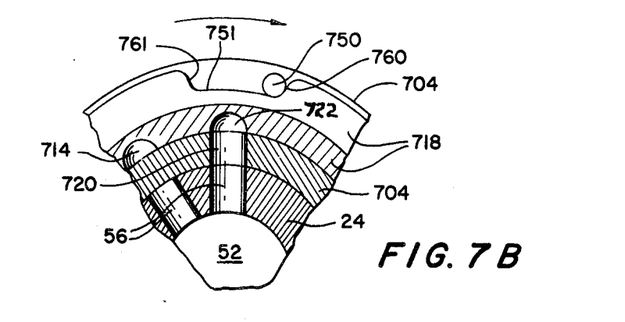
FIG. 7B is a partial sectional view taken along line 7B—7B of FIG. 7A.

The torque converter shown in FIGS. 7, 7A and 7B is basically of the same type as the one indicated in FIGS. 2 and 3 with the exception that the pump part 702 is arranged in the same way as the pump part 402 of FIG. 4. Compared with the structure according to FIG. 4, however, the lock-up friction coupling has been omitted. The feeder fluid source here always enters through the channel 50 and is evacuated through the channel 46. From the channel 56 the oil is however passed through opening 720 in a sleeve valve 728. This sleeve valve 728 has a surface 726 which frictionally engages surface 704 of the casing, and an abutment 750 which is located in a groove 751 of limited circumferential extent in turbine part 718. The sleeve valve 728 has two end positions which are determined by engagement of abutment 750 with the circumferential ends 760 and 761 of groove 751. Assuming that abutment 750 is initially in the middle position between 760 and 761 and the turbine rotates faster than the casing in the direction A, 728 will be held by the casing via frictional surfaces 704 and 726 until end 761 engages 750 and causes sleeve 728 to rotate with the turbine. In this position, opening 720 in the sleeve valve 728 aligns and thus interconnects openings 56 and 714 whereby fluid enters directly into the working chamber 710 through holes 714 in part 718 and 716 in the pump part 702 and leaves the working chamber through the channels 48 and 46. As soon as the turbine rotates at lower speed than the casing, the friction force between the surface 704 and 726 will move the valve sleeve 728 until abutment 75 engages the opposite end 760 of groove 751 as shown in FIG. 7A and 7B. The sleeve valve is now at its opposite end position at which opening 720 is aligned with and thus interconnects opening 56 and groove 722 in turbine part 718 leading to the space between the pump 702 and the rotating casing thereby causing the pump and the rotating casing to be connected together at 706 and 708 whereupon additional fluid exceeding the setting of the two-way maximum pressure valve 712 passes therethrough into the working chamber 710 and from there leaves through the holes 48 and 46. Just one of the two said passageways 714 or 722 can be connected to opening 720 at any given time. The object of this arrangement is to assure that the pump is released from the rotating casing and is more or less actively connected to the turbine and tends to rotate at higher speeds than the rotating casing, thereby reducing torque absorption of the rotating casing. This means that it is possible to utilize the whole converter range up to speed ratio 1:1, so that the torque absorption of the primary part of the torque converter is practically reduced to zero when for instance the engine speed is brought down to idling or any other speed, n2, which is higher than the turbine speed n1.

Figure 8:
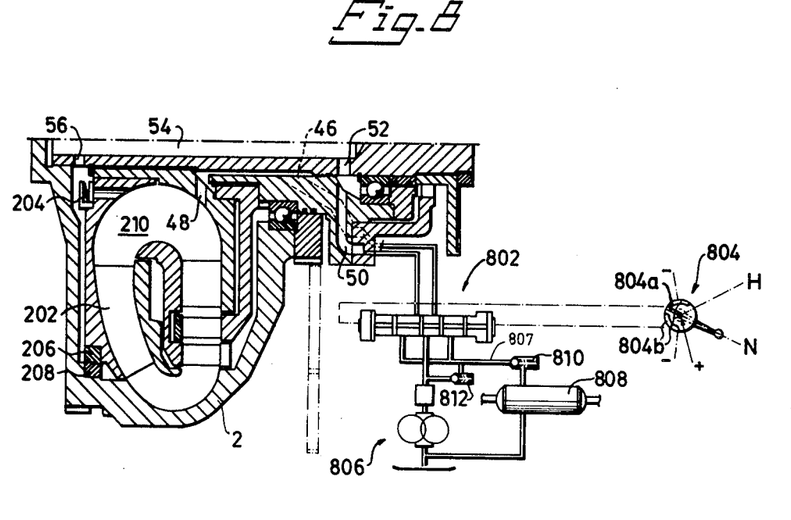
FIG. 8 shows diagramatically the arrangement for controlling the engagement and release of the pump in the torque converters according to FIGS. 2, 3 and 7.

FIG. 8 shows diagramatically an arrangement for controlling the engagement and release of the pump in torque converters of the kind shown in FIGS. 2, 3, and 7, but for convenience, only the numerals in the 200 series are shown in FIG. 8. The control means includes a control valve 802 of the five-way type for controlling the flow of fluid into and out of the passageways 46, 48 and 50, 52, 54, 56 respectively, and a remote control means 804 for the control of valve 802, and means 806 for supplying pressurized hydraulic fluid to the control valve 802.

The control valve 802, the remote control means 804 and the supply means of hydraulic fluid are of the conventional type and need no further explanation. The five-way control valve is of the cylinder-piston type in which a piston is formed with three chambers to selectively connect the two passageways of the torque converter with the supply means of hydraulic fluid 806 and a venting means 807 respectively. Such control of the fluid direction of the hydraulic fluid in the passageways of the torque converter is established by the piston of the control valve, which is movable within the cylinder thereof and which may take two opposite positions with the end of the piston engaging the corresponding end of the cylinder.

The remote control means 804 is of the air pressure type and is formed as a two-way valve, the two outlets of which are connected one to each end of the control valve cylinder. Pressurized air is supplied by a passageway 804a to either of the two control valve cylinder ends and vented air from the opposite end of the control valve cylinder may leave through either of two passageways 804b. As indicated in FIG. 8, pressurized air is supplied to the left hand side of the control valve cylinder which will force the piston to the right hand end of said cylinder. Pressurized hydraulic fluid is supplied through channels 46 and 48 into the working chamber of the torque converter thereby urging the pump thereof 202 into engagement with the rotating casing 2 over the cone clutch 206, 208 and any excess of hydraulic fluid is vented through the maximum pressure valve 204 and the passageways 56, 54, 52, 50 to the venting means 807 and through a heat-exchanger 808 to a storage tank for the hydraulic fluid. In the conventional manner the venting means 807 is provided with a valve 810 for the hydraulic fluid vented from the torque converter, and a maximum pressure valve 812 to vent hydraulic fluid from the supply means 806 in case both passageways in the torque converter are blocked, for instance by the two central landings of the control valve piston, thereby preventing damage of the supply means 806. If the handle of the remote control means 804 is turned to supply pressurized air to the side of the control valve on the right in FIG. 8, pressurized hydraulic fluid will be supplied through the passageways 50, 52, 54, 56 into the space between the pump 202 and the rotating casing 2 thereby urging the cone clutch 206, 208 out of connection, so that the pump 202 would be released from the rotating casing, and any excess of pressurized hydraulic fluid would pass between 206 and 208 and be vented through the passageways 48, 46, and into the venting means 807.

Figure 9:
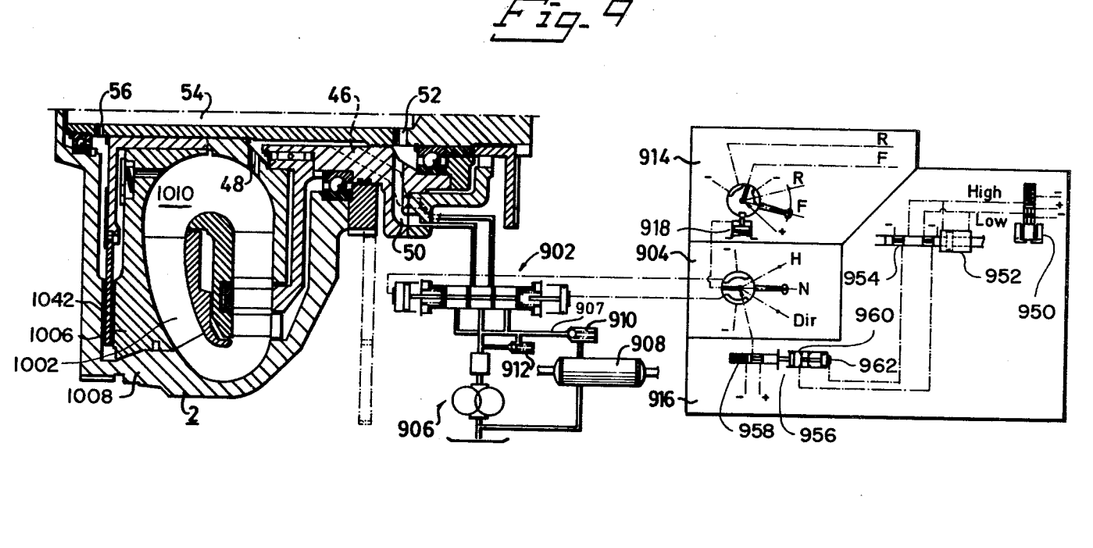
FIG. 9 shows diagramatically a feeder fluid and remote control means to be used for connection or release of the pump and connection or release of the direct drive parts respectively of the torque converter according to FIGS. 4, 5 and 6.

The structure of FIG. 9 is basically of the same type as that of FIG. 8, but the means 904 for controlling the connection and disconnection of the pump part is additionally provided with means 914 for controlling forward and reverse connection of the forward-reverse means shown in either FIG. 5 or FIG. 6 and a means 916 to be used in connection with the arrangement according to FIG. 6 assuring that the torque converter pump 602 will always be released while switching gears in the gear box 622 and will be re-engaged as soon as the gear switch is completed. The remote control means 904 may be utilized without the forward-reverse control means 914 and without the safety means 916 for the apparatus shown in FIG. 4, and the remote control means 904 together with the forward-reverse control means 914 may be utilized for the apparatus according to FIG. 4 together with a separate reverse gear according to FIG. 5, while the complete control device of FIG. 9 is preferably intended for the torque converter shown in FIG. 6. For convenience therefore, and to cover all of these possibilities, the parts of the torque converter in FIG. 9 will simply be referred to generally by numerals in the 1,000 series, i.e. the pump part is 1002, the working chamber is 1010, the friction clutch is 1042 and the engaging conical friction surfaces between the casing and the pump 1006 and 8. The forward-reverse control means 914 is connected to the remote control means 904, and it is provided with a locking means 918 in the form of a spring loaded ratchet, releaseable with pressure air which will lock the forward-reverse handle in the forward position in case the supply of pressurized air to the remote control means 904 ceases, or the valve 904 is not in the neutral position, and releases said handle to be turned to the reverse position when pressurized air is supplied to the remote control 904 and from there to the forward-reverse handle. The remote control means 904 is in this embodiment formed with three positions: a direct drive position (Dir), in which pressurized hydraulic fluid is supplied to the working chamber 1010 of the torque converter thereby urging the pump 1002 into engagement with the rotating casing 2 via the friction clutch 1042; a neutral position (N), in which the safety means 918 may release the forward-reverse control 914 to be switched to the reverse position; and a hydraulic drive position (H), in which pressurized hydraulic fluid is supplied to the space between the pump 1002 and the rotating casing thereby establishing a hydraulic drive between the pump and the rotating casing via the friction clutch 1006, 1008. In the neutral position of the remote control handle the piston of the control valve 902 is in a central position as indicated in FIG. 9, in which hydraulic fluid is supplied to both passageways, such that the pump 1002 is neither engaged by the friction coupling 1042 nor by the cone clutch 1006, 1008 to the rotating casing.

As mentioned above the safety means 916 is intended to provide an assurance that the pump of the torque converter is always released during the action of switching gears in the gear box in the apparatus according to FIG. 6 and to immediately reconnect the pump of FIG. 6 to the rotating casing as soon as the switching of a gear is completed. For this purpose the safety means 916 has one end thereof connected to the remote control means 904 so as to control the flow of pressurized air to said remote control means and has its opposite end connected to the gear box so as to obtain an indication of any switch of gears just intended to take place.

The function of safety means 916 is to automatically carry out shifts of the complementary gear 622 of FIG. 6. This necessitates release of the pump 1002 from the casing 2. A centrifugal regulator 950 initiates the shift by causing pressure air to flow to one or another side of a servo-piston 952 but simultaneously leads pressure air to a valve mechanism 954 connected to the servo-motor. When pressure air flows to one side of the servo-motor 952, it vents the pressure on the opposite side with the result that a valve mechanism 956, by means of a spring, takes a position cutting off the supply of pressure air to the valve 904. Thereby the valve 902 returns to neutral position, which means that pump part 1002 is released. When, however, the shift is carried out, and the servo-motor 952 has taken the position in relation to the pressurizing, pressure air is again conveyed to one piston, 960 or 962, effecting connection of pressure air to 904. The disconnection of the pump takes place in less than 0.1 sec. after the action of the centrifugal regulator, while it takes 0.2 sec. to release the coupling for high or low. When the re-connection is made, that is, when the piston has moved to its other position, then again the pump connects in less than 0.1 sec.

FIG. 10 is a torque diagram, in which the torque in kilopoundmeters is marked along the vertical axis, while the rotating speed $n_2$ of the output shaft of the torque converter connected to the turbine part thereof is marked along the horizontal line in revolutions per minute. The speed of the input shaft, which is connected to the rotating casing 2 was constantly 1700 rpm. In the diagram, two various situations are plotted, each including two curve lines. The first situation I refers to input and output torques when the pump of the torque converter is connected to the rotating casing, while the second situation II indicates the input and output torques when the pump is released from the rotating casing. In the first situation I, which is the same situation as in the prior art devices, the output torque $b_1$ decreases very quickly from the initial torque of about 49 kpm to slightly more than zero at 1700 rpm, and the input torque $a_1$ at the connected pump also decreases rather quickly, and the cross-point between the input torque $a_1$ and the output torque $b_1$ is located at about 1300 rpm, at which point the torque is the same and about 7.5 kpm.

It should be noted, that both the input torque $a_2$ and the output torque $b_2$ are extraordinarily low when the pump of the torque converter is released from the rotating casing, and in this case the input torque $a_2$ and the output torque $b_2$ are practically the same and about 1 kpm. It should be noted, that the output torque $b_2$ decreases under zero at about 625 rpm which means, that in the range A on the left hand side of this point the pump of the torque converter is delivering torque, while in the range B at the right hand side torque must be applied to the turbine to keep the speed.

It is evident from the above description that the structure according to FIG. 3 is basically the same as the structure of FIG. 2, but it is modified with respect to the friction connection between the pump and the rotating casing, so that this is made less sensitive and permits modulated connection or frequent connection to the engine at top speed, which is not normal for the structure according to FIG. 2. The structure according to FIG. 3 is therefore a preferred embodiment to be used in for instance a power shovel or perhaps a scraper. Torque shocks can be obtained by releasing the pump, so that the engine is allowed to increase its speed to top speed even at stall, whereupon the pump is engaged. Depending on what kind of input torque ratio is used torque shocks can be obtained, which are 50–100% higher than obtained by normal torque multiplication at stall. This seems to be the case in a power shovel digging into a hard material, in particular since the pump pressure may be increased during the release, and therefore a kind of swinging effect may be obtained. It is further obvious that for all three kinds of vehicles mentioned above torque converters according to FIGS. 2 and 3 permit a more free selection of the input torque characteristics and permit the use of power for accessories with less dependency than before.

The structure according to FIG. 4 is adapted for more general use. It is a modified embodiment of the structure according to FIG. 3 and is suitable for a dumper or a scraper, but it is also very suitable for trucks. With the structure according to FIG. 4 it is not possible to obtain a hydraulic braking, but when such a torque converter is combined with a multiple speed synchromesh gear box a suitable engine braking can be selected for each driving condition. The engine braking is of course not as valuable as the hydraulic braking, but objections are raised also with respect to the hydraulic braking obtained in a torque converter. A good hydraulic braking can be obtained with the aid of a hydrodynamic brake without the use of transmission oil but with the use of cooling water in combination with the torque converter. This solves the problems of dissipation of heat in the torque converter. It gives a continuously variable hydraulic braking, and the possibility of avoiding the hydraulic braking included in the torque converter involves a simplication of the torque converter. The structure according to FIG. 4 is therefore a type of torque converter transmission with very wide utility possibilities because it is easily adaptable for various purposes. Accessories, driven from the rotating casing may easily be provided.

FIGS. 5 and 6 show the principles of providing a torque converter of the kind mentioned above with mechanical gear trains, but it is obvious that a standard synchromesh transmission may alternatively be used together with the torque converter shown in FIG. 4.

FIG. 7 shows a modified embodiment of the torque converter according to FIGS. 3 or 4 adapted for instance for a scraper or a power shovel. When a secondary side release clutch is disconnected, the connection of the pump in a way acts as a free-wheel, only with the difference that the whole width of the efficiency field of the torque converter up to 1:1 speed ratio can be used with this arrangement, in which the efficiency of the blade system in question is within 60–70%, which means a better utilization of the torque converter than by using a free-wheel reaction member. If this structure is combined with a manual disconnection means is can also preferably be used together with a synchromesh transmission for instance in a dumper.

Although the invention has been described in considerable detail with respect to the preferred embodiments thereof, it will be understood that the invention is capable of numerous modifications and variations apparent to those skilled in the art without departing from the spirit and scope of the invention.

I claim:

1. A transmission system including a torque converter of the type having a rotating casing adapted to be connected to a drive source and forming therein a working chamber having therein a pump part including at least one ring of pump blades, a reaction part including at least one ring of guide blades and a turbine part including at least one ring of turbine blades, at least one of said pump part and said casing being a movable member movable axially towards and away from the other, such that the pump part and the casing are relatively movable axially between at least a first position in which the pump part is connected to the said casing for rotation therewith and a second position in which the pump part is released from the casing to rotate in relation thereto, a servo-motor means for moving the movable member between said first and second positions, the pump part being the piston of said servo-motor, such that a fluid pressure differential on opposite sides of said pump part effects movement of said movable member between said first and second positions, said turbine part being operatively connected to a turbine shaft, and including a mechanical gear transmission operatively connected to the turbine shaft downstream from the torque converter.

2. A transmission system according to claim 1, wherein said mechanical gear transmission is a forward-reverse gear.

3. A transmission system according to claim 2, including means for controlling the operation of the forward-reverse gear transmission, and means for preventing switching of the last said means between forward and reverse except when the pump part is released from the casing.

4. A transmission system according to claim 1, wherein said mechanical gear transmission is a synchromesh gear.

5. A transmission system according to claim 4, including a safety means hydraulically connected to the pump part to automatically release said pump part to rotate freely relative to the casing whenever shifting of the synchromesh gear takes place.

6. A transmission system according to claim 4, including a second mechanical gear transmission in addition to said synchromesh gear transmission and operatively connected to the turbine shaft.

7. A transmission system according to claim 1, said mechanical gear transmission having only engaged positions, and thus not having a neutral position, a remote control means for shifting the mechanical gear between different of said engaged positions, and means for preventing said remote control means from causing said shifting except when the pump part is released from the casing.

8. A transmission system according to claim 7, said mechanical gear transmission being a planetary gear having an input bevel gear connected to the turbine shaft, an output bevel gear and a planetary gear carrier having planetary gears thereon engaging both of said bevel gears, first coupling means coupling the two bevel gears together for rotation together in a forward direction and further means for disengaging the first coupling means and preventing the carrier from rotating such that the input bevel gear drives the output bevel gear in a reverse direction via the planetary gears.

9. A transmission system according to claim 8, said first coupling comprising a sleeve spring biassed to the engaged position, and said further means including a member movable to concurrently move the sleeve against its spring force to disengage the first coupling, and to engage a fixed part to prevent rotation of the carrier.

10. A transmission system according to claim 1, wherein there are two mechanical gear transmissions operatively connected to and located downstream from the turbine shaft, one of said mechanical gear transmissions being a forward-reverse gear.

11. A transmission system according to claim 10, including means for controlling the operation of the forward-reverse gear, and means for preventing switching of the last said means between forward and reverse except when the pump part is released from the casing.

12. A transmission system according claim 11, the other of said gears being a synchromesh gear, and including a safety means hydraulically connected to the pump part to automatically release said pump part to rotate freely relative to the casing whenever shifting of the synchromesh gear takes place.

13. A transmission system according to claim 10, including a safety means operatively connected to the pump part to automatically release said pump part to rotate freely relative to the casing whenever shifting of the said mechanical gear other than the forward-reverse gear takes place.

14. A transmission system including a torque converter of the type having an input shaft in the form of a rotating casing adapted to be connected to a drive source and forming therein a working chamber having therein a pump part including at least one ring of pump blades, a reaction part including at least one ring of guide blades and a turbine part including at least one ring of turbine blades, first connecting means for engaging the pump part with the said rotating casing for rotation therewith, second connecting means for connecting the turbine part with an output shaft for rotation therewith, one of said first and second connecting means being completely releasable so that the part engaged thereat including all blades of that part, upon being released, is completely released so as to be rotatable relative to its respective said shaft, one of said releasable part and its shaft being a movable member movable axially relative to the other between a first position at which the connecting means connects that part to its respective shaft and a second position at which the connecting means is released, a servo-motor means for moving the movable member between said first and second positions, the releasable part being the piston of said servo-motor such that a fluid pressure differential on opposite sides of said releasable part effects movement of said movable member between said first and second positions, and including a mechanical gear transmission operatively connected to the said output shaft downstream from the torque converter.

15. A transmission system according to claim 14, wherein said mechanical gear transmission is a forward-reverse gear.

16. A transmission system according to claim 15, including means for controlling the operation of the forward-reverse gear transmission, and means for preventing switching of the last said means between forward and reverse except when the releasable part is released from its shaft.

17. A transmission system according to claim 14, wherein said mechanical gear transmission is a synchromesh gear.

18. A transmission system according to claim 17, including a safety means hydraulically connected to the releasable part to automatically release said releasable part to rotate freely relative to its shaft whenever shifting of the synchromesh gear takes place.

19. A transmission system according to claim 17, including a second mechanical gear transmission in addition to said synchromesh gear transmission and operatively connected to the output shaft.

20. A transmission system according to claim 14, said mechanical gear transmission having only engaged positions, and thus not having a neutral position, a remote control means for shifting the mechanical gear between different of said engaged positions, and means for preventing said remote control means from causing said shifting except when the releasable part is released from its shaft.

21. A transmission system according to claim 20, said mechanical gear transmission being a planetary gear having an input bevel gear connected to the output shaft, an output bevel gear and a planetary gear carrier having planetary gears thereon engaging both of said bevel gears, first coupling means coupling the two bevel gears together for rotation together in a forward direction and further means for disengaging the first coupling means and preventing the carrier from rotating such that the input bevel gear drives the output bevel gear in a reverse direction via the planetary gears.

22. A transmission system according to claim 21, said first coupling comprising a sleeve spring biassed to the engaged position, and said further means including a member movable to concurrently move the sleeve against its spring force to disengage the first coupling, and to engage a fixed part to prevent rotation of the carrier.

23. A transmission system according to claim 14, wherein there are two mechanical gear transmissions operatively connected to and located downstream from the output shaft, one of said mechanical gear transmissions being a forward-reverse gear.

24. A transmission system according to claim 23, including means for controlling the operation of the forward-reverse gear, and means for preventing switching of the last said means between forward and reverse except when the releasable part is released from its shaft.

25. A transmission system according to claim 24, the other of said gears being a synchromesh gear, and including a safety means hydraulically connected to the releasable part to automatically release said releasable part to rotate freely reltaive to its shaft whenever shifting of the gear takes place.

26. A transmission system according to claim 23, including a safety means operatively connected to the releasable part to automatically release said releasable part to rotate freely relative to its shaft whenever shifting of the said mechanical gear other than the forward-reverse gear takes place.

* * * * *